(12) United States Patent
Dougherty

(10) Patent No.: US 9,513,158 B2
(45) Date of Patent: Dec. 6, 2016

(54) SOLAR DATA COLLECTION DEVICE

(71) Applicant: Harry Michael Dougherty, New Port Richey, FL (US)

(72) Inventor: Harry Michael Dougherty, New Port Richey, FL (US)

( * ) Notice: Subject to any disclaimer, the term of this patent is extended or adjusted under 35 U.S.C. 154(b) by 40 days.

(21) Appl. No.: 14/711,851

(22) Filed: May 14, 2015

(65) Prior Publication Data

US 2016/0069738 A1    Mar. 10, 2016

Related U.S. Application Data

(60) Provisional application No. 62/047,701, filed on Sep. 9, 2014.

(51) Int. Cl.
  *G01J 1/02*    (2006.01)
  *G01J 1/42*    (2006.01)

(52) U.S. Cl.
  CPC ........... *G01J 1/0238* (2013.01); *G01J 1/4228* (2013.01)

(58) Field of Classification Search
  CPC ............. G01J 1/02; G01J 1/42; G01J 1/0238; G01J 1/4228
  USPC .................... 356/213–225; 250/203.4, 208.2
  See application file for complete search history.

(56) References Cited

U.S. PATENT DOCUMENTS

| | | | |
|---|---|---|---|
| 4,190,465 A * | 2/1980 | Boling | H01L 31/055 136/247 |
| 4,225,781 A * | 9/1980 | Hammons | F24J 2/38 126/573 |
| 7,305,983 B1 | 12/2007 | Meder et al. | |
| 7,500,391 B2 | 3/2009 | Woro | |
| 7,516,557 B2 | 4/2009 | Courter | |
| 7,910,870 B2 | 3/2011 | Yeh et al. | |
| 8,386,179 B2 | 2/2013 | MacDonald | |
| 2011/0265840 A1 * | 11/2011 | Sela | G01J 1/18 136/244 |
| 2012/0121125 A1 | 5/2012 | Dimov | |
| 2013/0118099 A1 * | 5/2013 | Scanlon | F24J 2/5233 52/173.3 |
| 2013/0246010 A1 | 9/2013 | Derchowitz et al. | |
| 2013/0314699 A1 * | 11/2013 | Jungerman | G01J 1/0266 356/139.01 |
| 2014/0014837 A1 * | 1/2014 | Schnell | G03B 17/00 250/338.1 |
| 2014/0152632 A1 * | 6/2014 | Shedletsky | G09G 5/10 345/207 |

* cited by examiner

*Primary Examiner* — Sang Nguyen
(74) *Attorney, Agent, or Firm* — Thomas Frost

(57) ABSTRACT

The present invention is solar collection data device having a main housing with means to measure and record the sun's radiance over a period of time encased in the housing. The main housing is mounted to a platform. The platform has means to attach to a variety of surfaces, including a roof. A photovoltaic cell and a photo sensor are integrally formed in the cover of the main housing. The output of the photovoltaic cell and the photo sensor will be logged and used in determining the amount of sunlight reaching the unit.

11 Claims, 13 Drawing Sheets

SOLAR DATA COLLECTION DEVICE

FIELD OF THE INVENTION

The present invention relates to an improved solar data collection device mountable to a rooftop or other structures.

BACKGROUND OF INVENTION

The increased potential for the use of solar energy as a renewable source of energy is well known. The present device provides a low cost alternative to record the amount of sunlight received throughout the day to ascertain the availability of solar power savings in a given location.

It is an object of the device to measure and record the sun's radiance over a long period of time, preferably a year, with reasonable accuracy at a low unit cost. It uses two sensors to measure the sun's radiance; a photodetector and a monocrystalline solar cell. The unit temperature is also measured and saved, as a solar cell's efficiency changes with temperature. The photodetector, solar cell and temperature are periodically measured and saved along with the date and time into a flash RAM storage component.

The photodetector output provides a representation of the amount of sunlight the unit is receiving, but has a smaller collection area than the solar cell. The photodetector output is measured and saved and its secondary function is to indicate a minimum sunlight level with minimal power overhead. To preserve power, measurements are only taken while the sunlight is above the minimum output. The unit's solar cell provides a near identical representation of the solar panels that will ultimately be used by the customer, and can power the device's main circuitry, including the microcontroller.

It is an additional object of the invention to use a USB interface for transferring data to and from the unit to the user PC. The collected sun radiance data and other run-time data is retrieved from the unit. Control parameters, such as the location's date and time, are updated in the device through the USB interface.

It is another object of the invention to provide a variety of mounting means to secure to target locations. Means to secure to angled roofs, curved roofing tiles and flat roofs and windows are provided.

SUMMARY OF THE INVENTION

The general purpose of the present invention, which will be described subsequently in greater detail, is to provide a new and improved solar data collection device.

The device has a main housing comprising a cover affixed to a base. A circuit board is positioned in the base. The main housing is mounted to a platform. The platform has means to attach to a variety of surfaces, including a roof.

A photovoltaic cell and a photo sensor are integrally formed in the cover of the main housing. The output of the photovoltaic cell and the photo sensor will be logged and used in determining the amount of sunlight reaching the unit.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
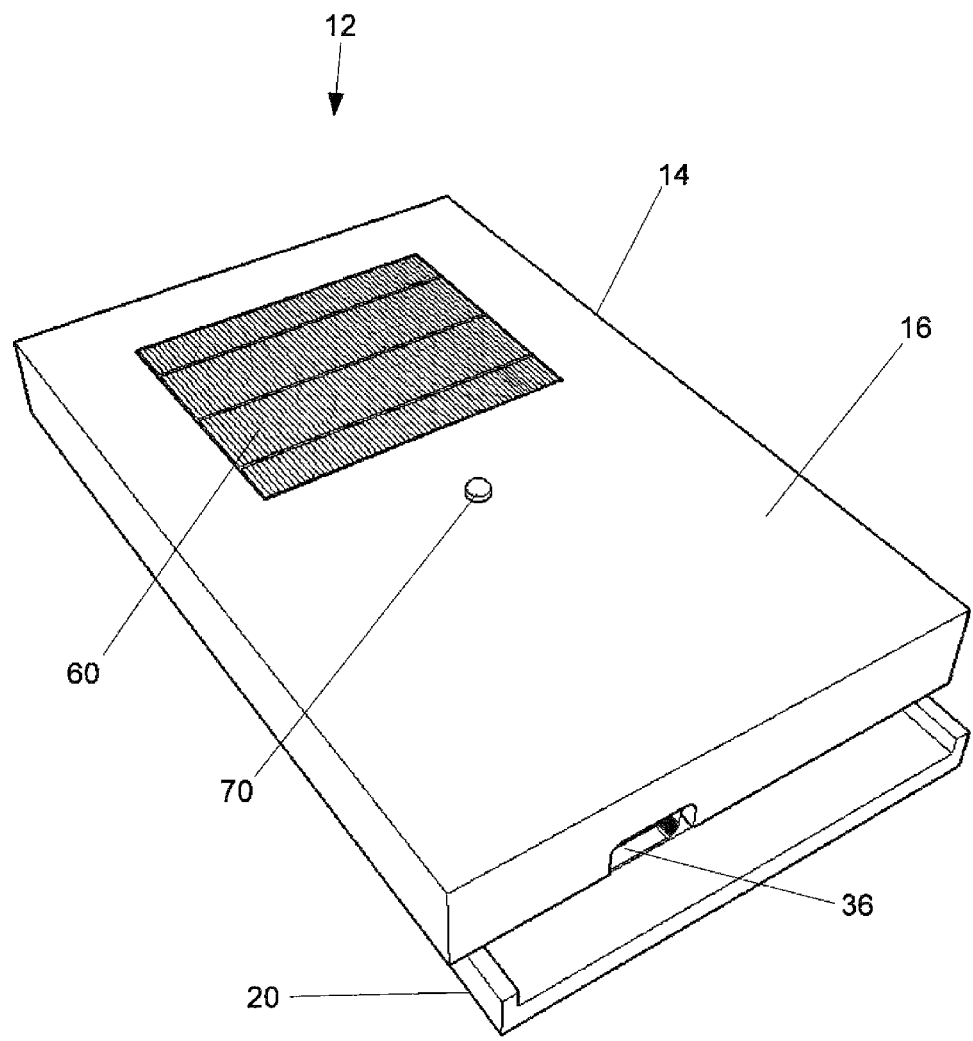
FIG. 1 is a perspective view of a first embodiment of the invention.
Figure 2:
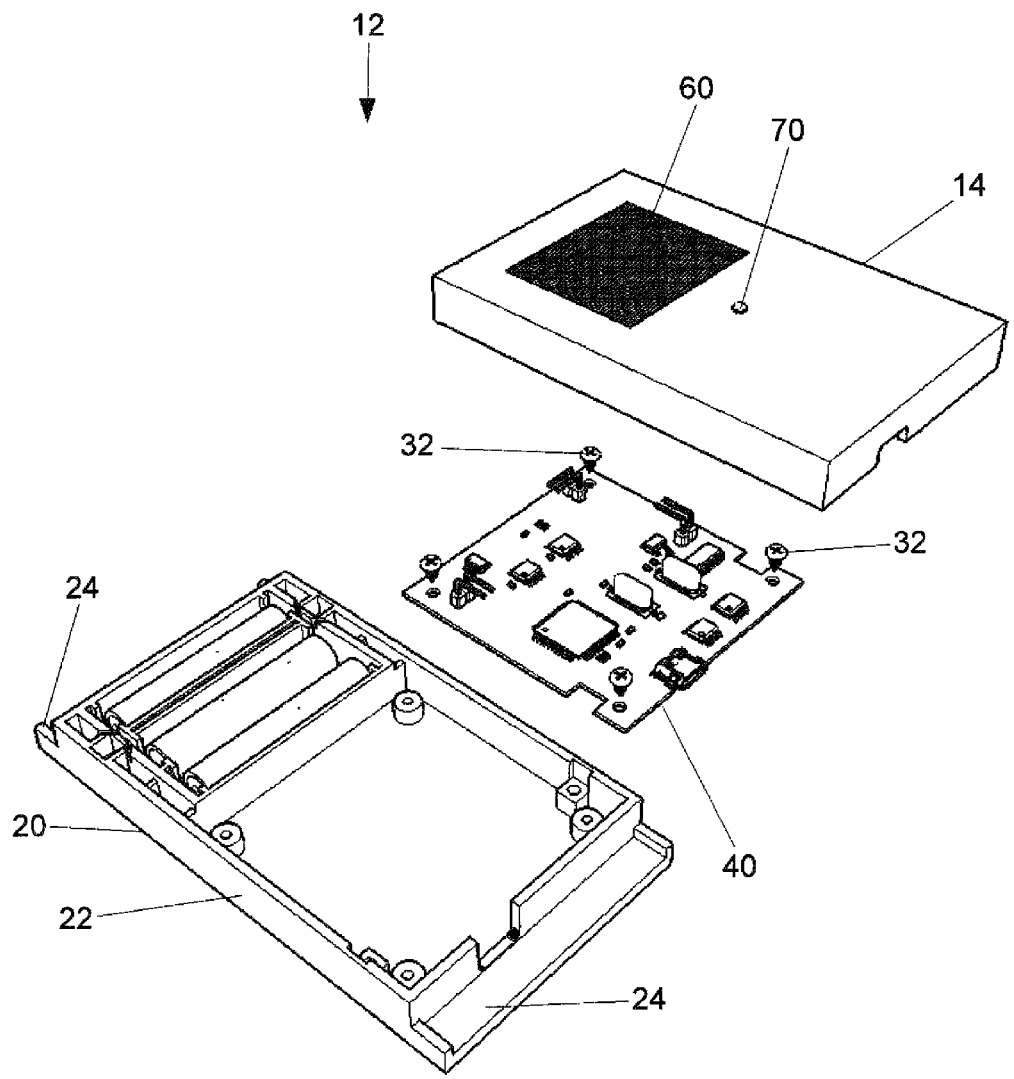
FIG. 2 is an exploded view of the first embodiment of the invention.
Figure 3:
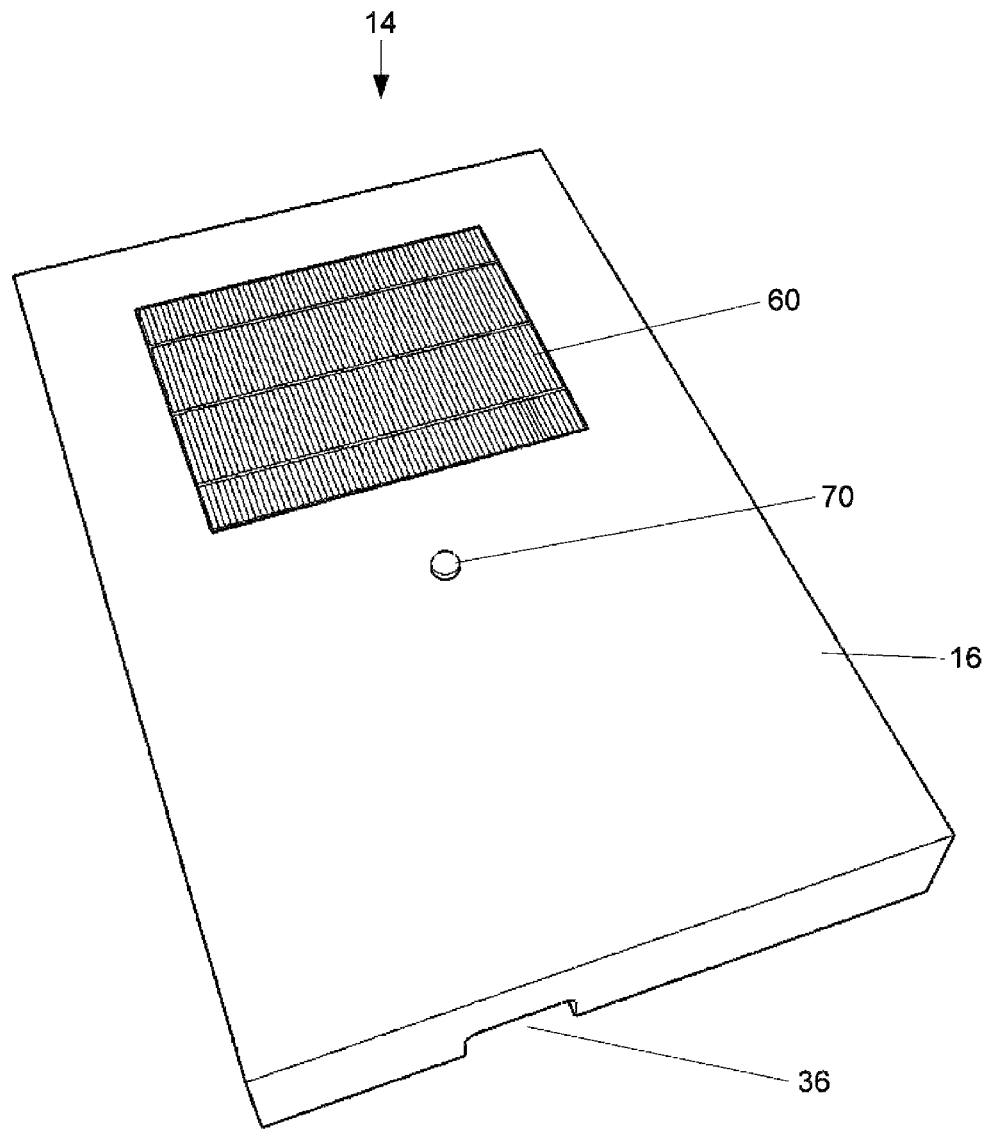
FIG. 3 is a top view of a cover of a housing of the first embodiment of the invention.
Figure 4:
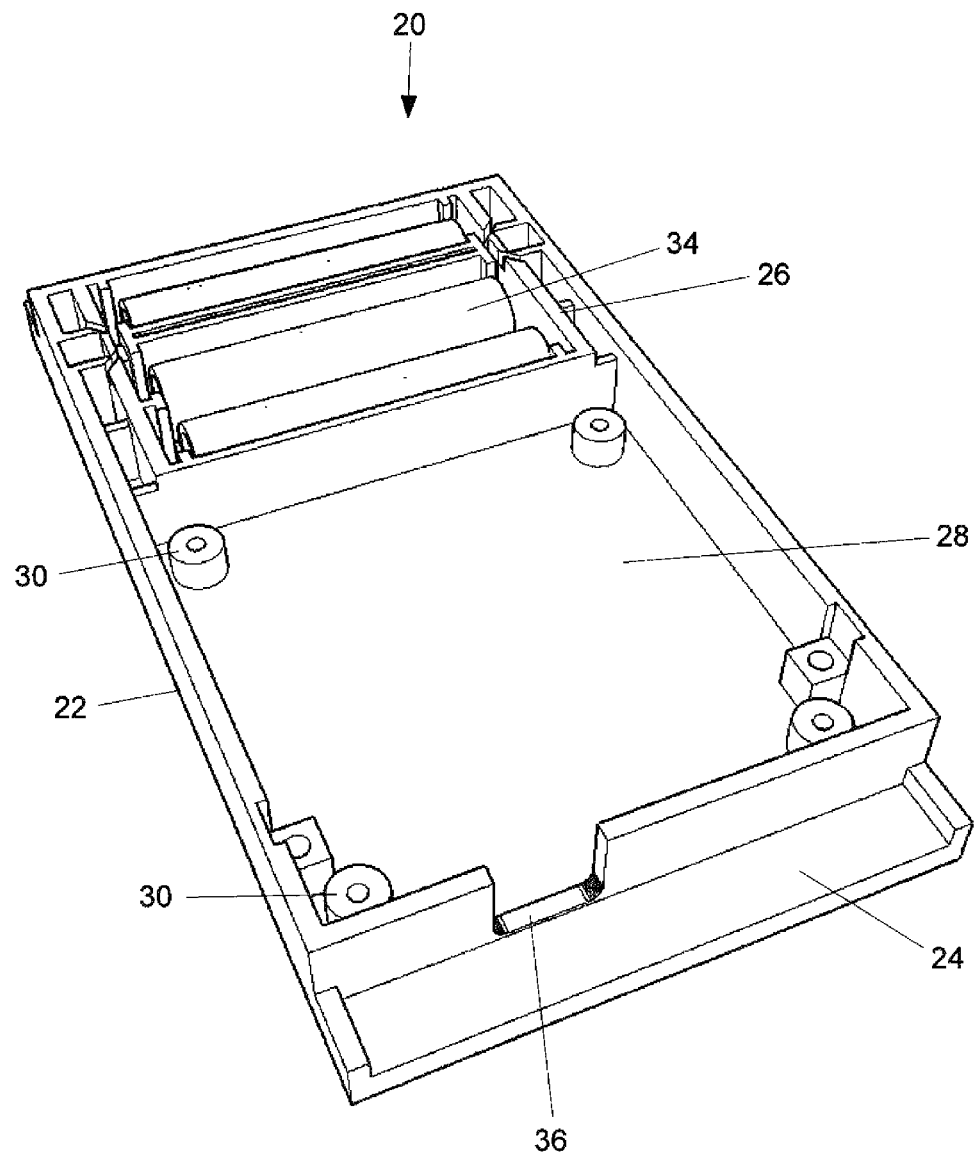
FIG. 4 is a top view of a base of the housing of the first embodiment of the invention.

Referring to the drawings FIGS. 1 to 7, generally, a first embodiment of the present invention will now be described in greater detail. A housing 12 is comprised of a cover 14 and a base 20. The cover 14 has an upper planer wall 16, side walls and end walls. The cover 14 is generally rectangular in shape. A photovoltaic cell 60 and a photo sensor 70 are integrally formed in the cover 14 of the housing 12.

The base 20 has a main body 22 with an upper surface and a lower surface, and front and rear extension mounting guides 24. A battery containment compartment 26 is integrally formed on the upper surface of the base 20. The base 20 further has a defined circuit board bay 28 for mounting a circuit board 40. A plurality of posts 30 with inwardly threaded bores extend upwardly from an upper surface of the bay 28. The circuit board is affixed to the posts 30 using attachment screws 32.

The battery containment compartment 26 is of predetermined size to accept batteries 34. The batteries 34 provide a power source for the device 10. Battery contacts are affixed on an inner surface of the compartment 26 and in electrical communication with the circuit board 40.

The cover 14 is securely mounted to the base 20. The housing 12 further has an open passage defined therein as a USB (universal serial bus) port 36. Battery replacement is accomplished by removing the cover 14.

Figure 5:
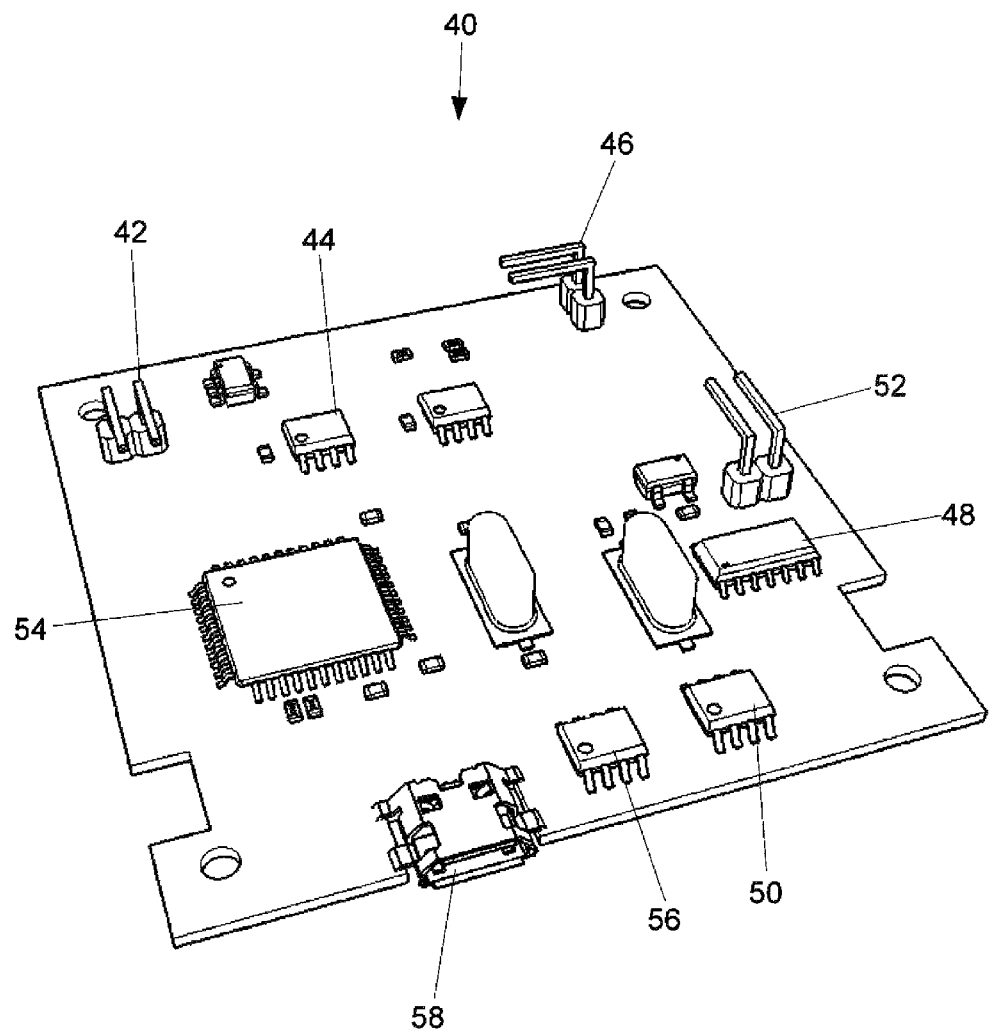
FIG. 5 is a top view of a circuit board of the first embodiment of the invention.

Components of the circuit board 40 providing multi-function features, electronic components, and a programmable integrated circuit, are illustrated in FIG. 5. A photodetector connector 42, solar cell power circuitry 44, a solar cell connector 46, real time clock means 48, flash RAM (random access memory) means 50 for flash storage, and a digital-to-analog convertor (DAC) 54 are disposed on an upper surface of the circuit board 40. A backup batteries connector 52 is electronically coupled with the batteries 34. A microcontroller 54 is disposed on the upper surface of the circuit board 40. A USB connector 58, to align with the USB port 36 of the housing 12, is provided.

Figure 12:
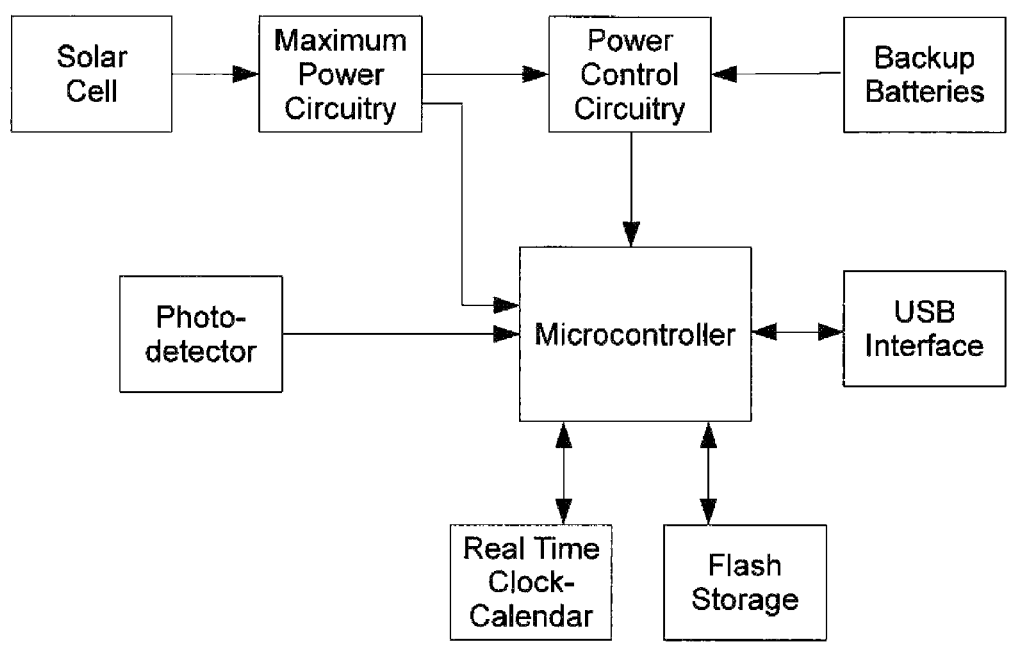
FIG. 12 is a block diagram illustrating functional aspects of the circuit board.
Figure 13:
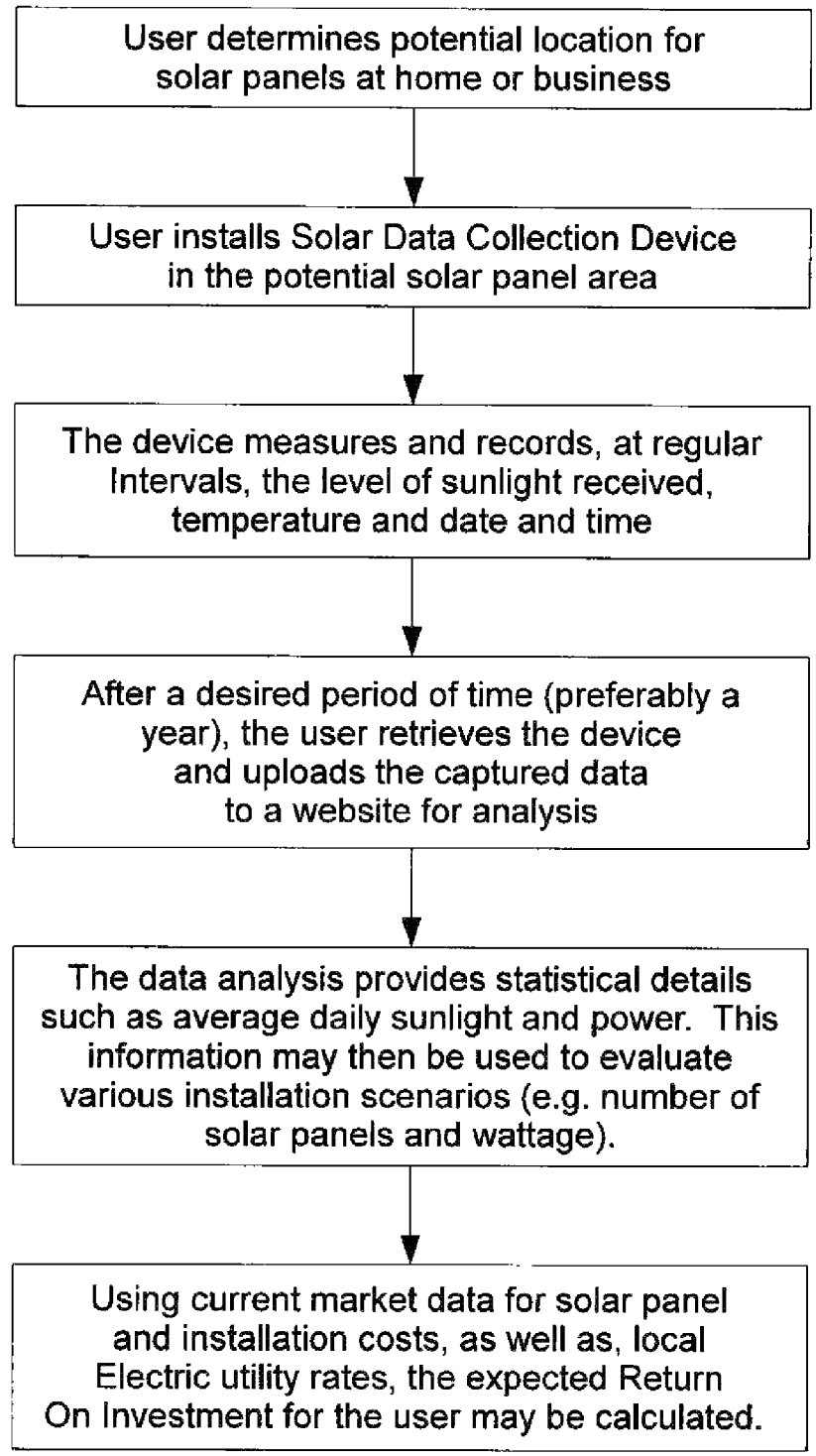
FIG. 13 is a flow chart.

As illustrated in the block diagram set forth in FIG. 12, the microcontroller 54 is in communication with the photo sensor 70, power circuitry, USB interface means, time clock means and real-time calendar means.

The photo sensor 70, in communication with the circuit board 40 through the connector 42, provides an output of the amount of sunlight the device 10 is receiving. The output is measured and saved. A secondary function is to indicate a minimum sunlight level with minimal power overhead. To preserve power, measurements are only taken when the sunlight is above the photo sensor 70.

A solar power interface is provided by the photovoltaic cell 60. The photovoltaic cell provides a nearly identical approximation of the solar panels that would ultimately be used by a customer. To gain an accurate measurement, the cell 60 requires a finding of its maximum power output. The maximum power output varies with the sunlight level. The voltage level at alternate current loads is measured to find the maximum product of the voltage and current, and establish the maximum power point (MPP). The device 10 is continuously calculating the maximum power point and will maintain a running average of the MPP. At regular intervals the MPP average value is saved to the flash RAM storage 50.

The photovoltaic cell 60 also powers the device's main circuitry, including the microcontroller 54. If the cell 60 output is insufficient to power the main circuitry, then the batteries 34 provide the necessary power. When the output of the cell is at a low level (e.g. at dusk or dawn), and the batteries are utilized, the microcontroller performs fewer MPP cycles to conserve battery power. If the sunlight level drops to near zero (e.g. at night) and the photo sensor output is below the minimum level, the device 10 is put into sleep/low-power mode. The real time clock 48 maintains the current date and time even when the device 10 is shutdown or in sleep mode.

The USB connector 58 provides a USB interface for transferring data to and from a personal computer (PC) of a user, or with a USB flash drive. The collected sun radiance data and other run-time data is retrieved. Control parameters, such as the location's date and time, are updated though the USB interface.

Figure 6:
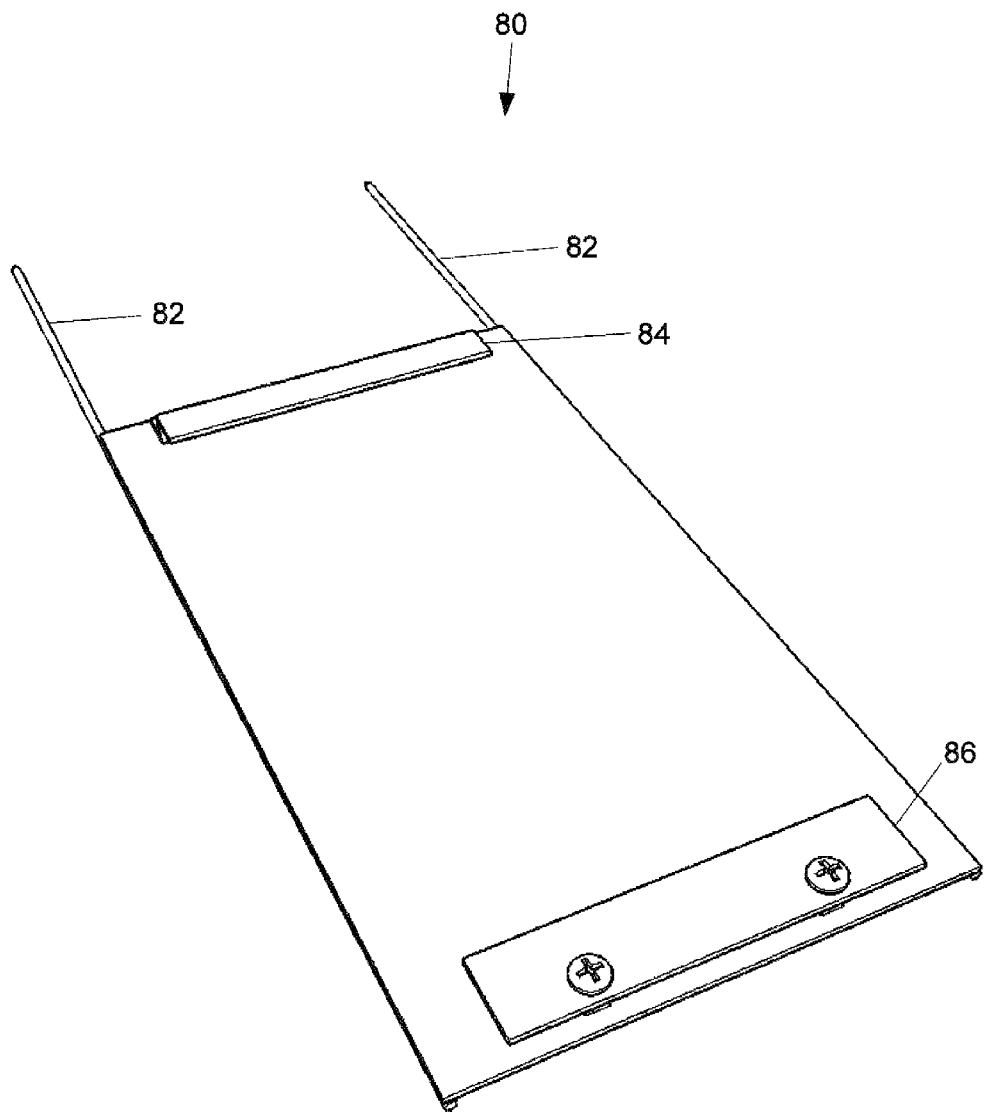
FIG. 6 is a top view of a platform of the first embodiment of the invention.
Figure 7:
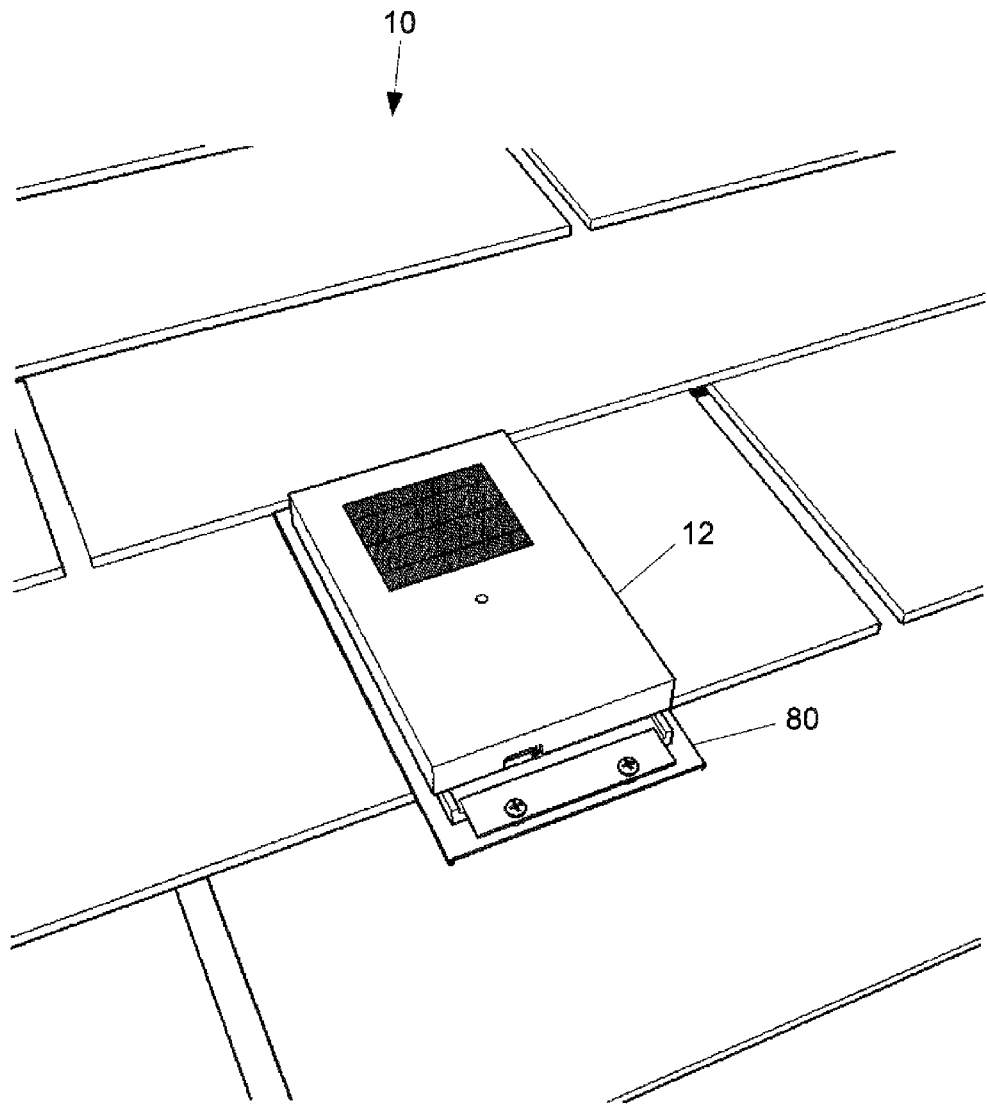
FIG. 7 is a view of the device hi use mounted on an asphalt shingle roof.

The housing 12 is detachably secured to a platform 80 (illustrated in FIG. 6). The platform 80 has an upper surface and lower surface with a pair of rods 82 of the base affixed to the lower surface. The platform 80 has a guide 84 and a clamp 86 affixed at opposed ends of the upper surface as means to secure the base 20. The front and rear extension mounting guides 24 of the base 20 are secured to the guide 84 and the clamp 86, respectively. The rods 82 slide under roof asphalt shingles to mount the device 10 on an angled roof. Adhesive may be applied to the lower surface of the platform 80 to assist with securing the device 10.

Figure 8:
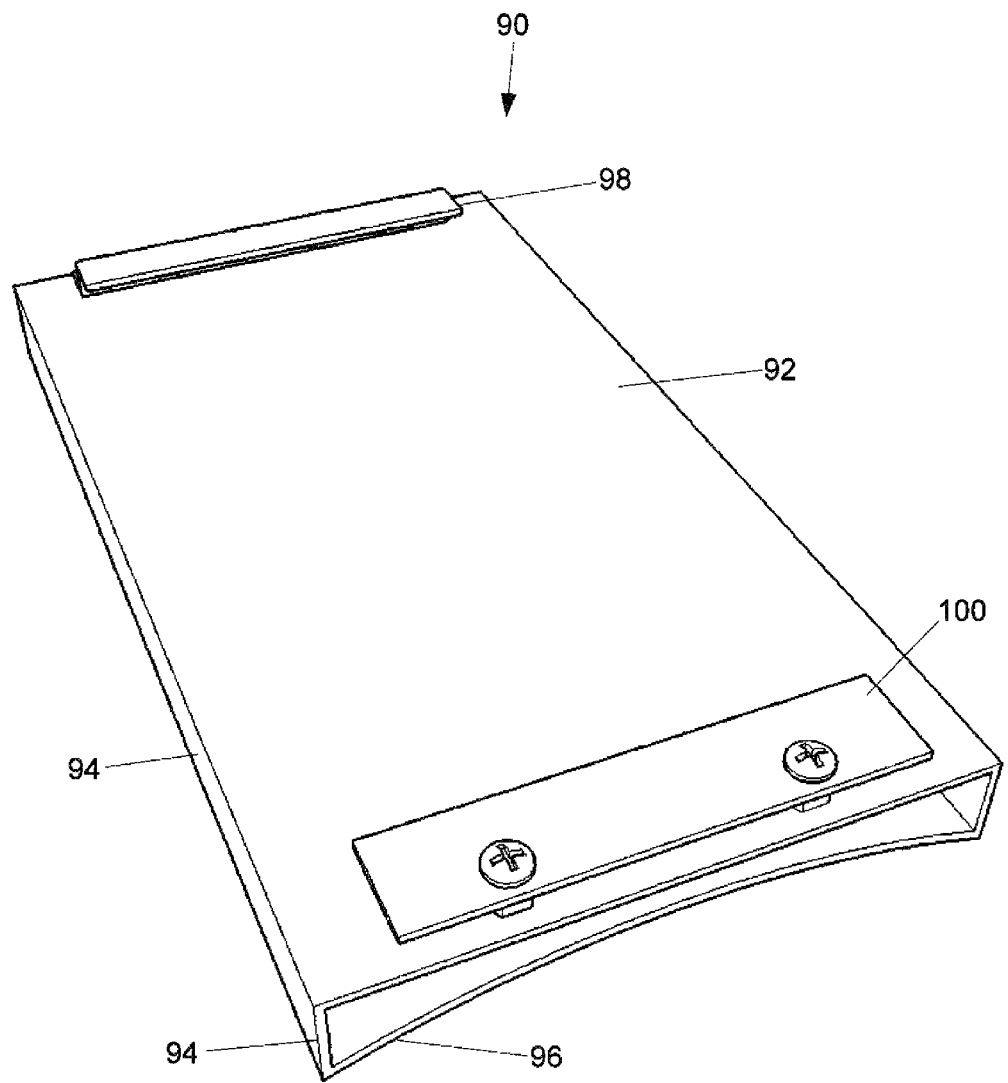
FIG. 8 is a second version of the platform.

A second version of a platform 90 is illustrated in FIG. 8. The platform 90 has an upper wall 92, side walls 94 and a curvilinear shaped base wall 96. An outer surface of the base wall 96 is configured to complement standard curved roofing tiles, and includes removable adhesive the adheres the platform 90 to the tiles. On an outer surface of the upper walls the platform 90 has a guide 98 and a clamp 100 affixed at opposed ends of the upper surface as means to secure the base 20. The front and rear extension mounting guides 24 of the base 20 are secured to the guide 98 and the clamp 100, respectively.

Figure 9:
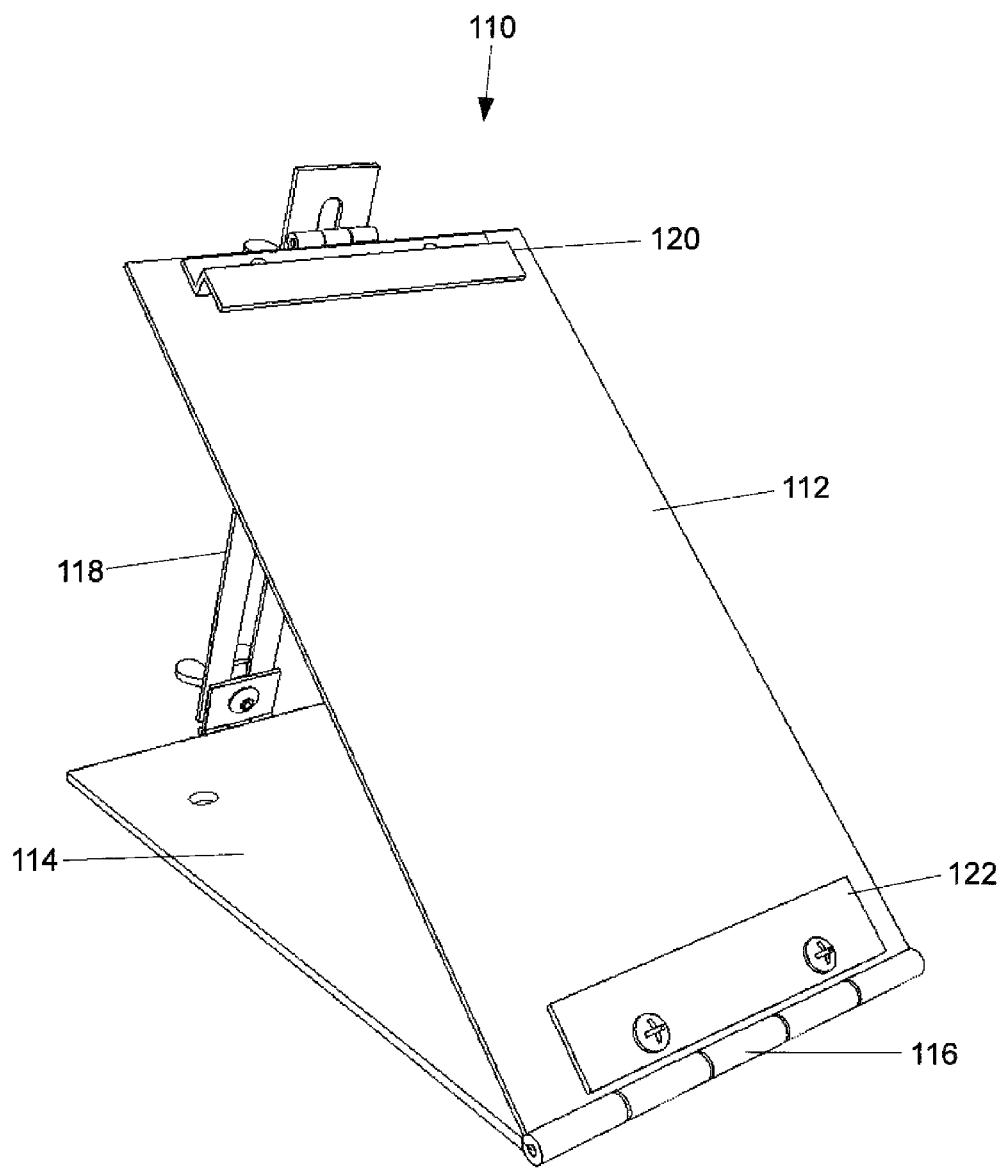
FIG. 9 is a third version of the platform.

A third version of a platform 110 is illustrated in FIG. 9. Platform 110 has an upper panel 112 and a lower panel 114 with a first end of the upper panel 112 attached to a first end of the lower panel 114 via hinge means 116. A sliding angle adjustment means 118 affixed to second ends of the upper panel 112 and lower panel 114, permit the positioning of the upper panel 112 to an angle of up to 60 degrees from the lower panel 114. The lower panel 114 may be secured to roof or wall surfaces using nails, screws or applicable adhesives. The upper panel 112 of the platform 110 has a guide 120 and a clamp 122 affixed at opposed ends of an upper surface. The front and rear extension mounting guides 24 of the base 20 are secured to the guide 120 and the clamp 122, respectively.

Figure 10:
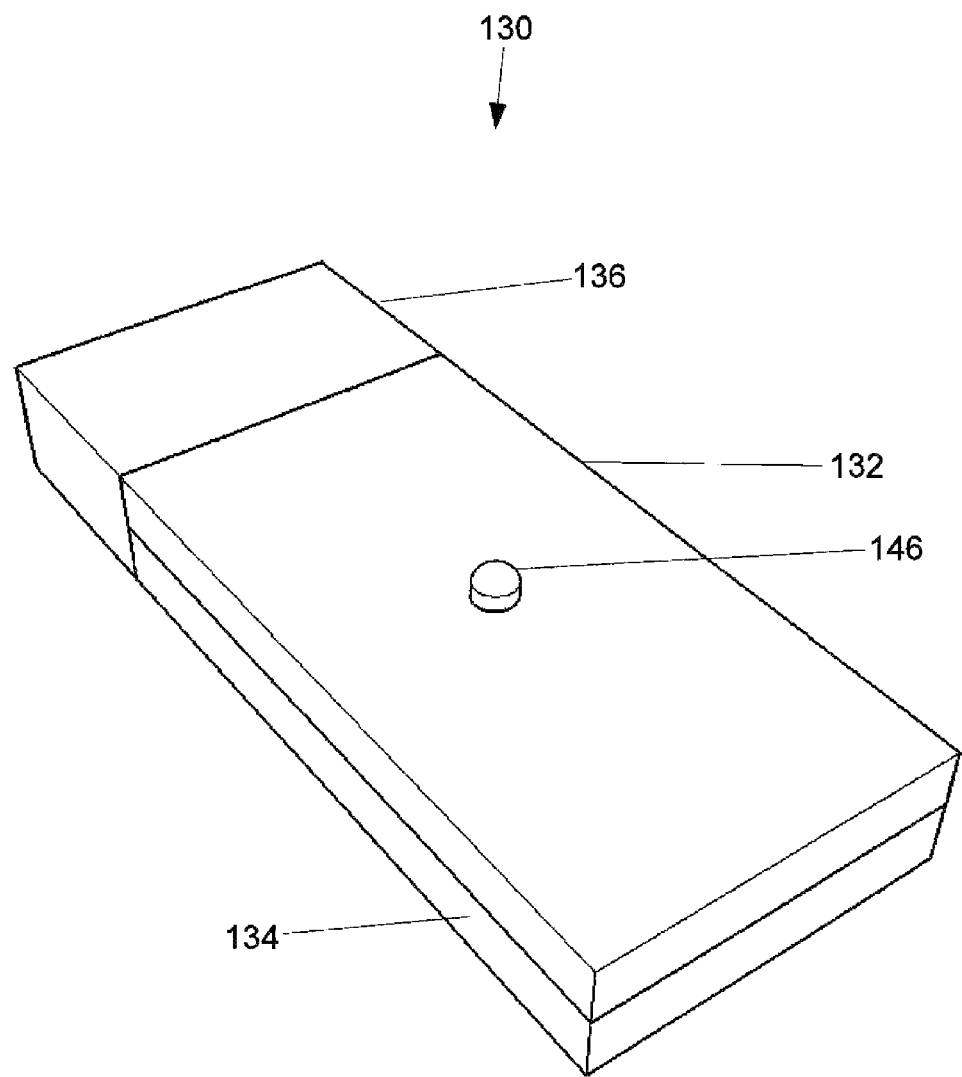
FIG. 10 is a perspective view of second embodiment of the invention.
Figure 11:
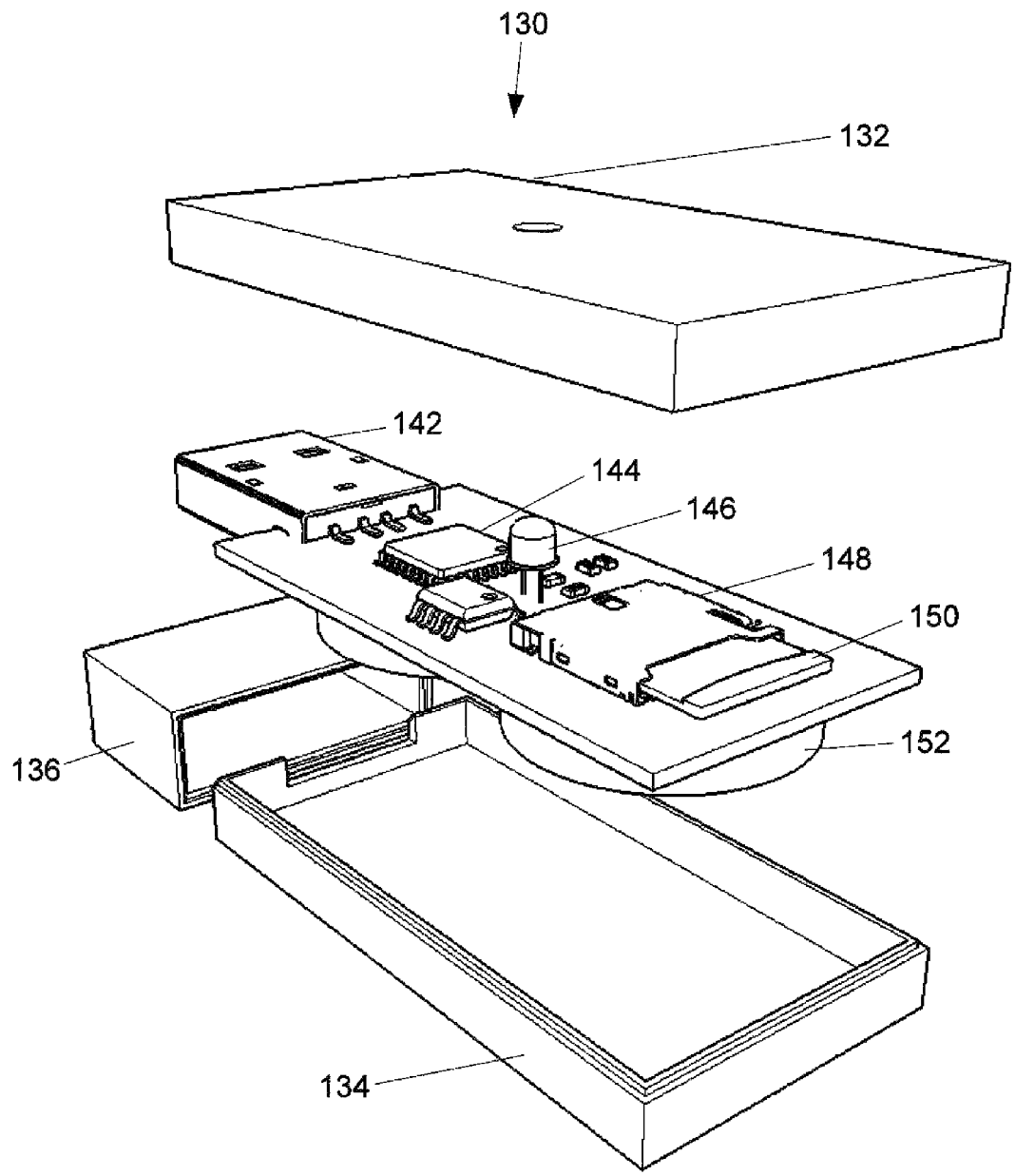
FIG. 11 is an exploded view of the second embodiment.

An alternative embodiment of the invention 10 is illustrated in FIGS. 10-11. The housing 130 has a cover 132, a base 134 and a detachable cap 136. The cover 132 has a passage formed therethrough. A circuit board 140 has a USB connector 142, a microcontroller 144, a photo detector 146, a MicroSD socket 148 and removable microSD card 150 providing means to record sun radiance data, affixed thereto. Rechargeable batteries 152 provide power. The circuit board 140 is mounted in the base 134. The photo detector 146 is positioned through the passage of the cover 132. The photo detector 146 provides a representation of sunlight received. The device is powered by the batteries 152.

The USB connector 142 provides a means to recharge the batteries 150. The cover 132, base 134 and cap 136 connect to each other, and when disconnected from each other, the microSD 150 (having collected sun radiance data) is removeable. The USB interface may be functional and the microSD card 150 is replaced with non-removeable flash RAM.

The housing 130 is composed of lightweight material and is mountable to a desired surface using an adhesive (e.g. double sided tape).

With respect to the above description then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawing are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

I claim:

1. A solar data collection device, comprising in combination:
   a platform;
   a housing having a base and a cover detachably secured to the base, mountable to the platform;
   a photovoltaic cell integrally formed with the housing;
   a photo sensor integrally formed with the housing;
   a circuit board mounted on the base;
   a photodetector connector disposed on the circuit board and operatively engaged with the photo sensor;
   a photovoltaic cell connector disposed on the circuit board and operatively engaged with the photovoltaic cell; and
   a microcontroller disposed on the circuit board operatively in communication with the photovoltaic cell and the photosensor, and wherein the microcontroller is adapted to measure and record radiance of sunlight during a pre-determined time frame.

2. The device as set forth in claim 1, further comprising a circuit board bay defined in the base for mounting the circuit board.

3. The device as set forth in claim 2, whereby the base further comprises mounting guides extending from opposed ends of the base.

4. The device as set forth in claim 3, whereby the platform has a pair of rods affixed to a lower surface, and the platform further has a guide and a clamp affixed at opposed ends of an upper surface to secure the mounting guides of the base to the platform.

5. The device as set forth in claim 3, whereby the platform comprises an upper wall, side walls and a curvilinear shaped base wall, and the platform further has a guide and a clamp affixed at opposed ends of an upper surface of the upper wall to secure the mounting guides of the base to the platform.

6. The device as set forth in claim 3, whereby the platform comprises an upper panel and a lower panel attached to each other at first ends by hinges, and the platform further has a guide and a clamp affixed at opposed ends of an upper surface of the upper panel to secure the mounting guides of the base to the platform.

7. The device as set forth in claim 1, further comprising batteries as a power source.

8. The device as set forth in claim 7, whereby the housing further comprises a universal serial bus (USB) port formed therein, and a USB connector aligned with the USB port, and whereby the USB connector provides a universal serial bus interface for transferring sun radiance data to and from a personal computer or with a USB flash drive.

9. A solar data collection device, comprising in combination:
   a housing having a base and a cover detachably mounted on the base, and whereby the cover has a passage defined therethrough;
   a circuit board mounted in the base;
   a photo detector affixed on the circuit board and positioned through the passage of the cover;
   a microcontroller affixed on the circuit board;
   a MicroSD socket affixed on the circuit board and having a removeable microSD card mounted therein, and the microSD card being operatively coupled to the photo detector and the microcontroller, wherein the microSD is adapted to record sun radiance; and
   at least one battery as a power source.

10. The device as set forth in claim 9, further comprising a USB connector affixed to the circuit board and operatively coupled to the batteries.

11. The device as set forth in claim 9, further comprising a cap detachably connected to the cover and the base.

* * * * *